A. A. BENDER.
RESILIENT VEHICLE WHEEL.
APPLICATION FILED JAN. 10, 1917.
1,224,060.
Patented Apr. 24, 1917.
2 SHEETS—SHEET 1.
Fig. 1.
Fig. 2.
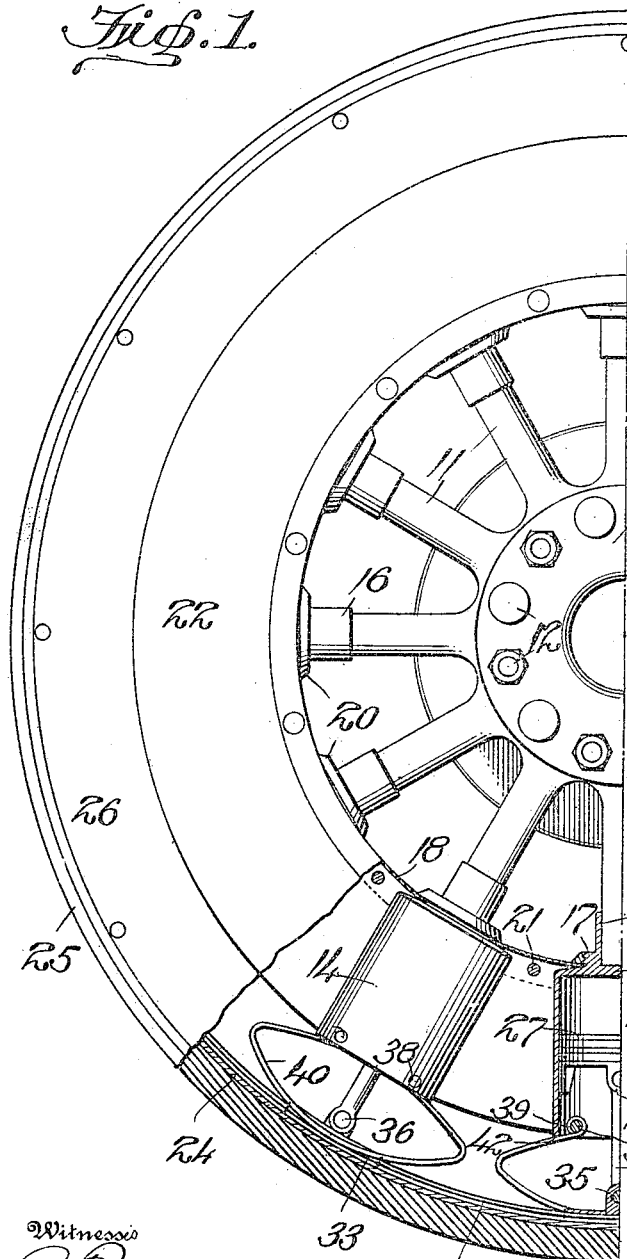
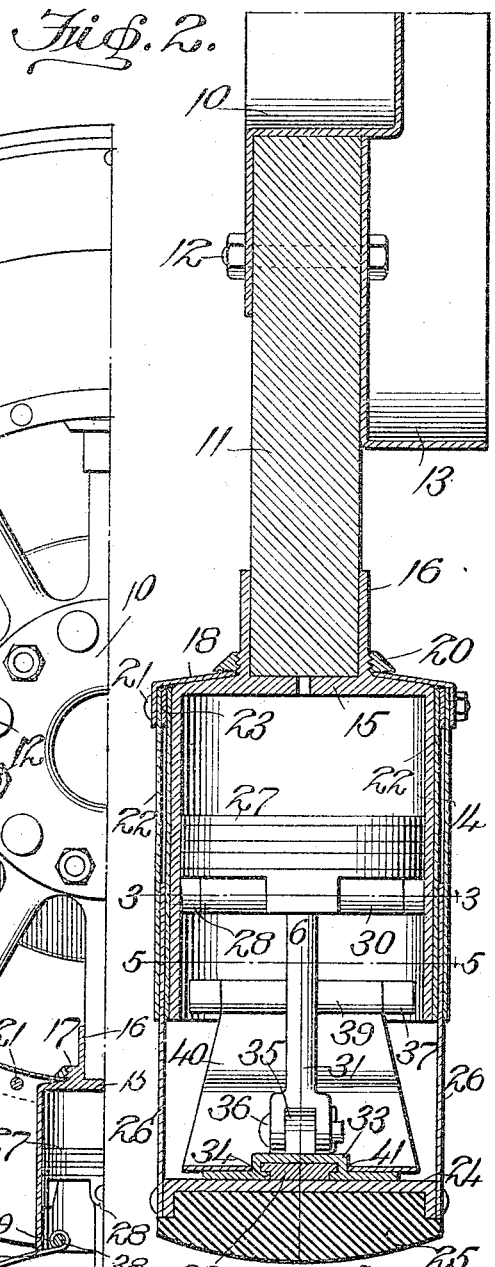
Witnesses
C. Bailey
L. N. Gillis
Inventor
A. A. Bender,
By Chandler & Chandler
Attorneys

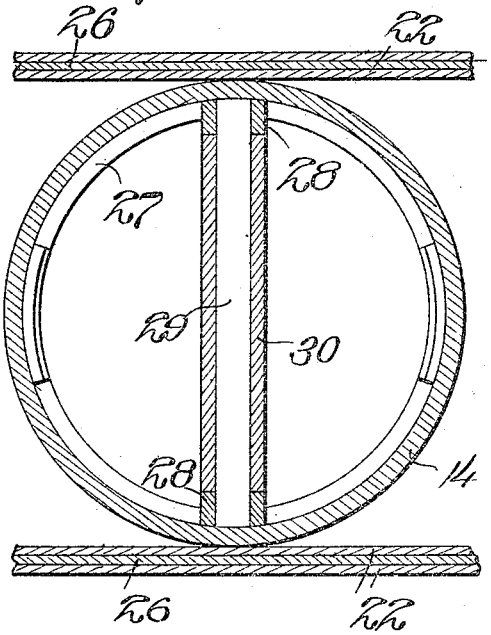
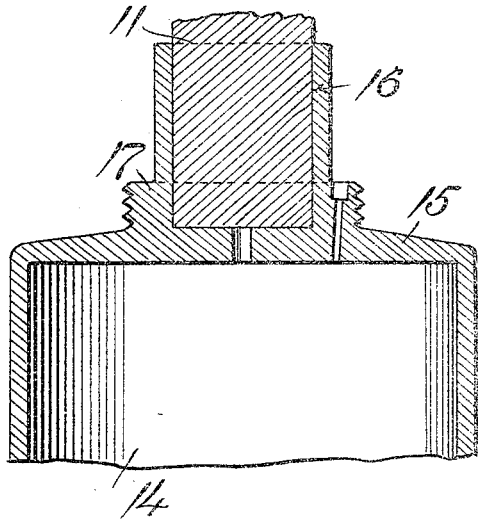
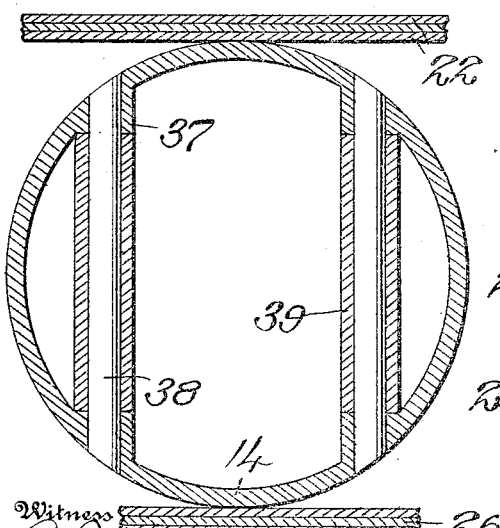
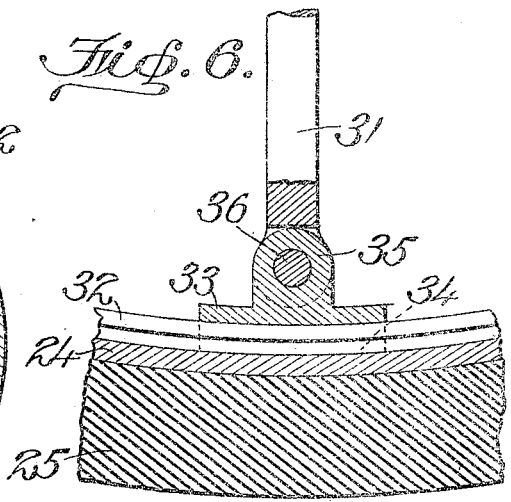

UNITED STATES PATENT OFFICE.

ADOLPH A. BENDER, OF PINEBLUFF, WYOMING, ASSIGNOR TO BENDER RESILIENT WHEEL MFG. COMPANY, OF PINEBLUFF, WYOMING, A CORPORATION OF WYOMING.

RESILIENT VEHICLE-WHEEL.

1,224,060.  Specification of Letters Patent.  Patented Apr. 24, 1917.

Application filed January 10, 1917. Serial No. 141,618.

*To all whom it may concern:*

Be it known that I, ADOLPH A. BENDER, a citizen of the United States, residing at Pinebluff, in the county of Laramie, State of Wyoming, have invented certain new and useful Improvements in Resilient Vehicle-Wheels; and I do hereby declare the following to be a full, clear, and exact description of the invention, such as will enable others skilled in the art to which it appertains to make and use the same.

This invention relates to vehicle wheels and has special reference to an improved form of resilient vehicle wheels.

One important object of the invention is to provide an improved general construction for wheels of this character.

A second important object of the invention is to provide an improved arrangement of yielding spokes for use in connection with this type of wheel.

A third important object of the invention is the provision of an improved form and arrangement of combined hydraulic and spring buffers for use in connection with wheels of this character.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is an elevation of half a wheel constructed in accordance with this invention, the view being partly in section and certain parts being broken away to show those behind said broken away parts.

Fig. 2 is a transverse section through such a wheel, the view being partly in elevation.

Fig. 3 is a section on the line 3—3 of Fig. 2.

Fig. 4 is an enlarged detail section showing the outer end of one of the spokes, the cylinder and the parts connected thereto.

Fig. 5 is a detail section on the line 5—5 of Fig. 2.

Fig. 6 is a detail section on the line 6—6 of Fig. 2.

In the embodiment of the invention herein illustrated there is disclosed a hub 10 from which radiate spokes 11, the spokes being secured to the hub by means of bolts 12 as shown. Moreover, the same bolts may be used, if desired, to secure a brake drum 13 to the spokes.

Each of these spokes carries a cylinder 14 provided with a closed end 15 having thereon a socket 16 arranged to fit the end of the respective spoke. Adjacent the closed end 15 each of these sockets is exteriorly thickened to provide a circular boss 17 threaded on the exterior. Over these bosses engages an inner rim 18 which is provided with suitable openings to receive the bosses and is held in position by means of the nuts 20 screwed on said bosses. It is to be observed that this rim is channeled shaped in cross section and through the flanges of the rim pass bolts 21 which serve to hold cover rings 22 spaced apart by a spacing ring 23. The outer rim 24 is formed of a channel iron with the flanges turned outward to receive the anti-skid tire 25. On the sides of this channel iron are secured plates 26 which extend between the plates 22 so that the cylinders are covered in while at the same time the outer rim can move with respect to the inner rim.

Reciprocable in each of the cylinders is a piston 27 having on its outer face, adjacent its periphery, lugs 28 wherethrough passes a pin 29. On this pin 29 is mounted an elongated sleeve 30 and projecting centrally from the sleeve is a piston rod 31. Alined with each of the spokes is a T-shaped guide 32 which is fixed to the outer rim 24 in such manner as to provide grooves extending peripherally of the rim. Slidably mounted on the guide 32 are connecting plates 33 having ribs 34 fitting the grooves formed by the member 32. Centrally of each of the plates 33 is a projecting ear 35 which is straddled by the forked end of the rod 31, said rod being pivotally connected to the ear by a bolt or pin 36.

Within each of the cylinders are spaced pairs of alined bosses 37 wherethrough pass pins 38 which also pass through eyes 39 formed on the ends of C springs 40. Each of these springs has an opening 41 in the center of its back and these openings engage the central raised portions of the plates 33 so that these plates are thus held yieldably in alinement with the axes of the cylinders.

Moreover, it is to be noted that the springs 40 contact with the mouths of the cylinders near their eyes 39 as shown at 42.

In the use of the wheel it will be observed that weight placed on the hub will compress the springs 40 at the lower part of the wheel and move the pistons 27 inwardly of the cylinders. The air at the inner end of said cylinders will form a spring cushion and assist the springs 40 in doing their work. At the sides of the wheel the springs 40 permit the displacement of the normally alined portions of the inner and outer rims but, when the pressure is relieved cause the disalined portions to immediately resume their alinement.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a wheel of the class described, an inner rim, an outer rim, a plurality of cylinders spaced radially about the inner rim, a piston working in each of said cylinders, an internal peripheral guide member secured to the inner face of the outer rim, plates having interengagement with said peripheral guide member and pivotally secured to said piston, and C springs having their ends secured within the cylinders, and adapted to engage the plates at a point intermediate the ends of the said spring.

2. In a wheel of the class described, an inner rim, an outer rim spaced from the inner rim, cylinders spaced radially about the inner rim, a guide member fixed on the inner surface of the outer rim and extending peripherally thereof, plates slidably mounted on said guide and provided with inwardly projecting central portions, rods pivotally connected to said plates and pistons, and C springs having central openings fitting the inwardly projecting portions of the plates and having their ends pivotally connected to said cylinders.

3. In a wheel of the class described, an inner rim, an outer rim spaced from the inner rim, cylinders spaced radially about the inner rim, guides fixed on the inner surface of the outer rim and extending peripherally thereof, plates slidably mounted on said guides, and provided with inwardly projecting central portions, rods pivotally connected to said plates and pistons, and C springs having central openings fitting the inwardly projecting portions of the plates and having their ends pivotally connected within the outer ends of said cylinders, the portions of the springs adjacent their ends bearing against opposite edge portions of said cylinders.

4. In a wheel of the class described, an inner rim, an outer rim, a plurality of cylinders carried by the inner rim, pistons operating in said cylinders, a peripheral guide secured to the inner face of the outer rim, plates engaging said peripheral guide and having their outer face in contact with the inner face of the outer rim, links connecting said plates with said piston, and C springs having their ends secured within the piston and provided with an opening intermediate their ends to receive the guide engaging portions of said plates.

In testimony whereof, I affix my signature, in the presence of two witnesses.

ADOLPH A. BENDER.

Witnesses:
CHAS. C. GROSS,
T. H. WELLS.

Copies of this patent may be obtained for five cents each, by addressing the "Commissioner of Patents, Washington, D. C."